(12) United States Patent
Hsieh et al.

(10) Patent No.: US 11,349,110 B2
(45) Date of Patent: May 31, 2022

(54) METHOD FOR FORMING LEAD-CARBON COMPOUND INTERFACE LAYER ON LEAD-BASED SUBSTRATE

(71) Applicant: National Formosa University, Yunlin County (TW)

(72) Inventors: Shu-Huei Hsieh, Yunlin County (TW);
Kai-Yi Song, Yunlin County (TW);
Yi-Ren Tzeng, Yunlin County (TW);
Ya-Wun Jan, Yunlin County (TW);
Jing-Xiu Lin, Yunlin County (TW);
Bo-Shun Wang, Yunlin County (TW);
Jyun-Neng Chen, Yunlin County (TW)

(73) Assignee: NATIONAL FORMOSA UNIVERSITY, Yunlin County (TW)

( * ) Notice: Subject to any disclaimer, the term of this patent is extended or adjusted under 35 U.S.C. 154(b) by 222 days.

(21) Appl. No.: 16/740,934

(22) Filed: Jan. 13, 2020

(65) Prior Publication Data
US 2020/0227720 A1    Jul. 16, 2020

(30) Foreign Application Priority Data

Jan. 14, 2019    (CN) .......................... 201910030232.4

(51) Int. Cl.
*H01M 4/04*    (2006.01)
*H01M 4/56*    (2006.01)
*H01M 4/133*    (2010.01)

(52) U.S. Cl.
CPC ............. *H01M 4/04* (2013.01); *H01M 4/133* (2013.01); *H01M 4/56* (2013.01)

(58) Field of Classification Search
CPC ........... H01M 4/04; H01M 4/133; H01M 4/56
See application file for complete search history.

(56) References Cited

U.S. PATENT DOCUMENTS

| 2016/0236235 A1* | 8/2016 | Lee ........................ C09K 3/00 |
| 2017/0263912 A1* | 9/2017 | Tzeng .................. H01M 4/366 |
| 2018/0151872 A1* | 5/2018 | Zhamu ................. H01M 4/366 |
| 2018/0233780 A1* | 8/2018 | Ishikawa ............... H01G 11/60 |

FOREIGN PATENT DOCUMENTS

CN    109980284 A * 7/2019

OTHER PUBLICATIONS

EPO machine generated English translation of CN-109980284-A (Year: 2019).*

* cited by examiner

*Primary Examiner* — Christopher P Domone
*Assistant Examiner* — Kimberly Wyluda
(74) *Attorney, Agent, or Firm* — Volpe Koenig

(57) ABSTRACT

The present disclosure discloses a method for forming a lead-carbon compound interface layer on a lead-based substrate, wherein the lead-based substrate has a surface, and the method includes steps of: causing an acidic solution to contact with a carbon material and a lead-containing material to form a carbon-containing plumbate precursor having an ionic lead; and reducing the ionic lead in the carbon-containing plumbate precursor to form the lead-carbon compound interface layer on the surface.

20 Claims, 10 Drawing Sheets

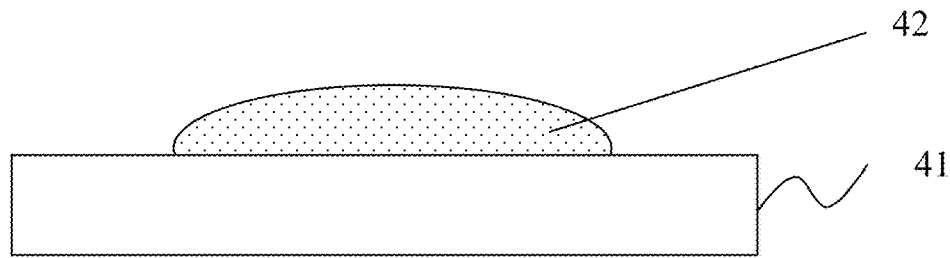

Fig. 4A

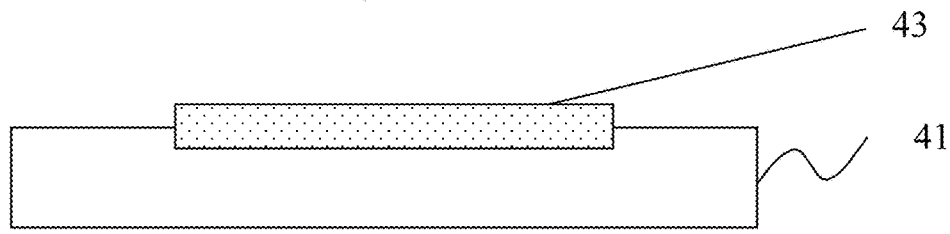

Fig. 4B

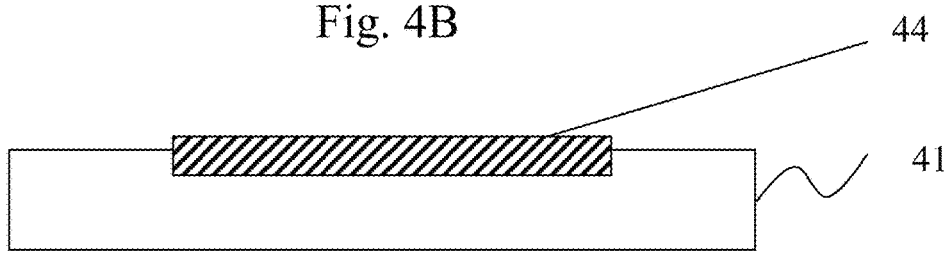

Fig. 4C

| | |
|---|---|
| The acidic solution and the carbon material are mixed to form a second interface activator solution 42 | S51 |
| The second interface activator solution is applied on the surface of the lead-based substrate 41 and thereby the acidic solution in the second interface activating solution 42 erodes the surface of the substrate 41 and forms a carbon-containing plumbate precursor layer 43 on the surface of the substrate 41 | S52 |
| Reducing the ionic lead in the carbon-containing plumbate precursor, thereby forming the lead-carbon compound interface layer on the surface, especially on the surface of the substrate in contact with the carbon material | S12 |

Fig. 5

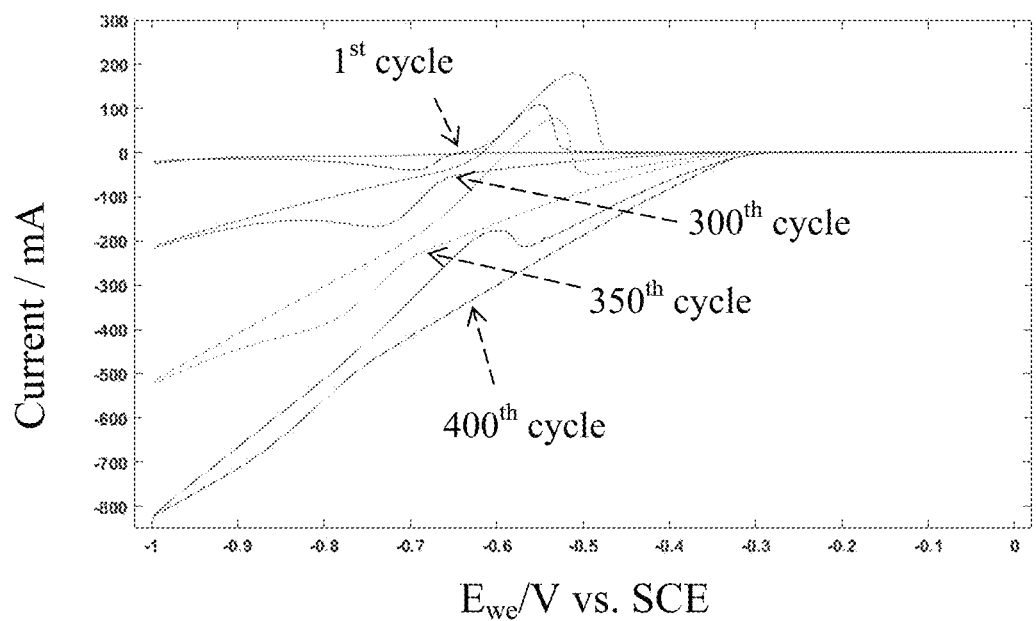
Fig. 8
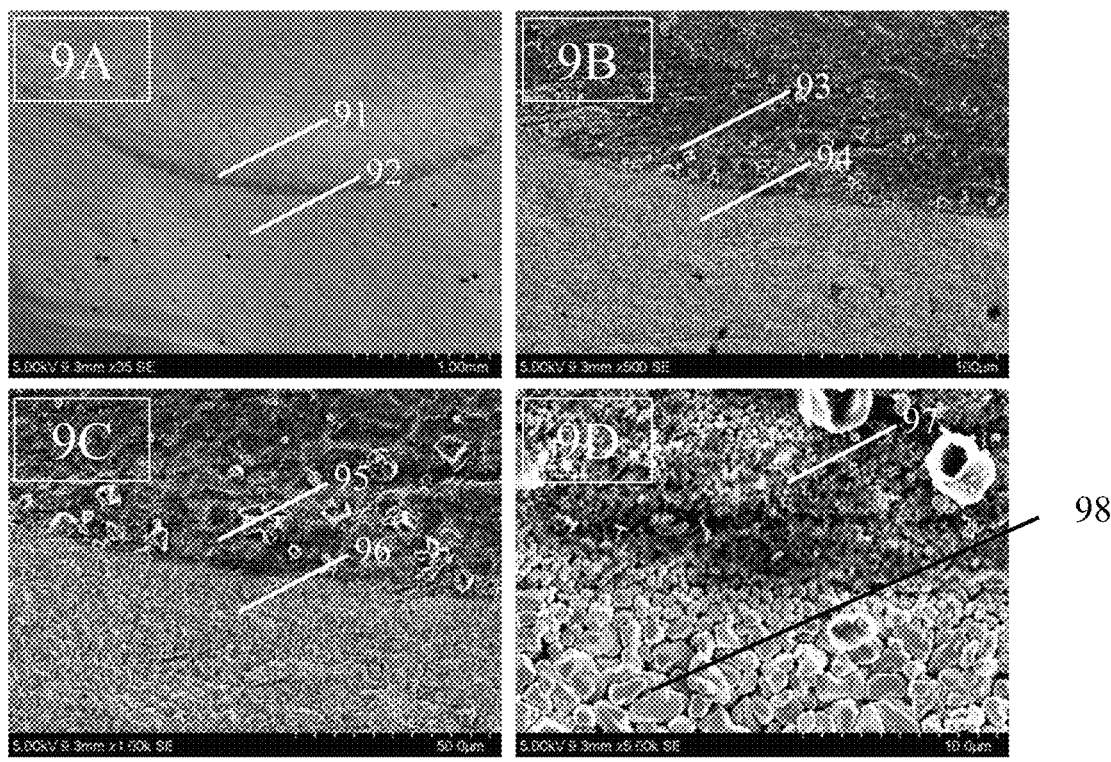
Figs. 9A~9D

METHOD FOR FORMING LEAD-CARBON COMPOUND INTERFACE LAYER ON LEAD-BASED SUBSTRATE

CROSS-REFERENCE TO RELATED APPLICATION AND CLAIM OF PRIORITY

The present disclosure claims the right of priority based on China Patent Application Serial No. 201910030232.4, filed on Jan. 14, 2019, at the China National Intellectual Property Administration, the disclosure of which is incorporated herein in their entirety by reference.

FIELD OF THE DISCLOSURE

The present disclosure is related to a method of forming an interface layer. In particular, the present disclosure is related to a method of forming a lead-carbon compound interface layer.

BACKGROUND OF THE DISCLOSURE

The storage of electric power is a key technique in electric power source management and in the usage of regenerating energy. The storage of electric power includes physical and chemical types. In consideration of the necessity of rapid electricity charging and discharging capability as well as high storage capacity, the electrochemical battery has become the first priority for the application of micro-grid energy storage.

In the field of electrochemical batteries, the well developed hybrid lead-carbon battery, which is a combination of a conventional lead-acid battery and an asymmetrical super capacitor, provides a possible solution to implement an electric power storage device that is likely to achieve economic benefits. The super capacitor having a rapid charge and discharge capability and combined with the conventional lead-acid battery can inhibit the occurrence of a sulfurization reaction on the negative electrode (e.g. a lead plate electrode) of the battery during the high rate partial stage of charge (HRPSoC) process, which dramatically decreases the life time of the battery after each cycle of charging and discharging. The so-called sulfurization effect is that the solid metal lead ($Pb_{(s)}$) on the negative electrode reacts with the sulfite ion ($HSO_4^-{}_{(aq)}$) in the sulfuric acid solution during the oxidation process and is converted into non-conductive solid sulfuric lead ($PbSO_{4(s)}$). During the period in deep discharge or in the HRPSoC process, lead sulfate, which is non-conductive, easily forms and crystallizes. As the non-conductive lead sulfate grains gradually cover the surface of the lead electrode, the reverse reduction reaction cannot reduce all lead sulfate into metal lead due to poor conductivity. Thus, the energy storage efficiency of the battery is reduced and battery life time is also shortened.

Currently, a method to improve the issue of sulfurization of the negative electrode is to add a carbon material to the lead electrode to increase the contact area between the lead sulfate and the conductive carbon material. This method can increase the life time of lead-acid batteries. However, without undergoing special high pressure (about 400 MPa) and high temperature (about 950° C.) treatment to form chemical bonds at the carbon-lead interface, the contact between the carbon materials and the lead electrode is only physically rather than chemically bonded, so the structure of the carbon modified electrode in the general process is quite loose. That is to say, the structural strength of the lead electrode decreases with the increase in the amount of carbon material added, so there is a certain limit to the addition ratio of the carbon material.

In addition, in the manufacture of such a hybrid type lead-carbon battery, a lead battery paste on a negative electrode of a conventional lead-acid battery is replaced partly or completely with a carbon material capacitor paste having a high specific area porosity. That is to say, the production of the hybrid lead-carbon battery can be completed through a highly industrialized conventional lead-acid battery manufacturing process, so it has the added benefit of low production costs. Moreover, the lead-acid battery itself has the properties of extremely high stability (or low maintenance cost) and high cyclic charge/discharge efficiency (about 75%). Therefore, this kind of hybrid lead-carbon battery can be used as an energy storage device of the micro grid class and for the lowest cost.

Although the combination of the conventional lead-acid battery and the asymmetric super capacitor can provide low-cost power storage, the utilization efficiency and life time of the battery are adversely reduced. The reason is that two materials, i.e. a carbon material and a lead plate, present on the negative electrode plate are unable to bond to each other and cause the phenomena such as electrode interface corrosion and the like that easily occur on the lead-carbon interface.

Therefore, a method that can effectively bond carbon material to lead material is very important for the preparation of an electrode for the hybrid lead-carbon battery. In other words, it is a very important step on the way to achieving the goals of mass production and development of the hybrid lead-carbon battery.

In prior art, although the bonding problem between the lead and carbon materials can be solved by using coupling agents such as the precious metal, e.g. titanium, palladium, and platinum, or their oxides, these precious metal coupling agents are quite expensive and are still not beneficial to electrode production.

Therefore, the Applicant has disclosed a method for forming a lead-carbon compound interface layer on a lead-based substrate to improve the problems of the prior art mentioned above.

SUMMARY OF THE DISCLOSURE

In accordance with one aspect of the present disclosure, it provides a method for forming a lead-carbon compound interface layer on a lead-based substrate, wherein the lead-based substrate has a surface, the method comprising steps of: causing an acidic solution to contact with a carbon material and a lead-containing material to form a carbon-containing plumbate precursor having an ionic lead; and reducing the ionic lead in the carbon-containing plumbate precursor to form the lead-carbon compound interface layer on the surface.

In accordance with the other aspect of the present disclosure, it provides a method for preparing an electrode material having a lead-based substrate forming thereon a lead-carbon compound interface layer, wherein the lead-based substrate has a surface, and the method comprising steps of: causing an acidic solution to contact with a carbon material and a lead-containing material to form a carbon-containing plumbate precursor having an ionic lead; and reducing the ionic lead in the carbon-containing plumbate precursor to form the lead-carbon compound interface layer on the surface.

The above objectives and advantages of the present disclosure will become more readily apparent to those ordinarily skilled in the art after reviewing the following detailed descriptions and accompanying drawings, in which:

BRIEF DESCRIPTION OF THE DRAWINGS

FIGS. 4A-4C are schematic cross-sectional views of substrates formed by the method of forming a metal-carbon compound interface layer on a surface of a metal-based substrate according to a second embodiment of the present invention.

FIG. 5 is a flowchart of a method of forming a metal-carbon interface layer on a surface of a metal-based substrate according to the second embodiment of the present invention.

FIG. 8 is a cyclic voltammetry (CV) diagram of an electrode with a lead/GO compound interface layer made by the method according to the present invention.

FIGS. 9A-9D are SEM photographs of the interfaces of the electrodes, after the test of 400 cycles of cyclic voltammetry, with and without the lead/GO compound interface layer made on the electrode surface by the method according to the present invention.

DETAILED DESCRIPTION OF THE EMBODIMENTS

The present disclosure will now be described more specifically with reference to the following embodiments. It is to be noted that the following descriptions of embodiments of the present disclosure are presented herein for the purposes of illustration and description only; they are not intended to be exhaustive or to be limited to the precise form disclosed.

The material having a lead-carbon compound interface layer made by the method according to the present invention can be applied to electrodes used in an acid battery including, but not limited to, a lead-acid battery. For example, the material for the positive electrode (i.e. the cathode) is lead dioxide, and the material for the negative electrode (i.e. the anode) is lead.

Figure 1:
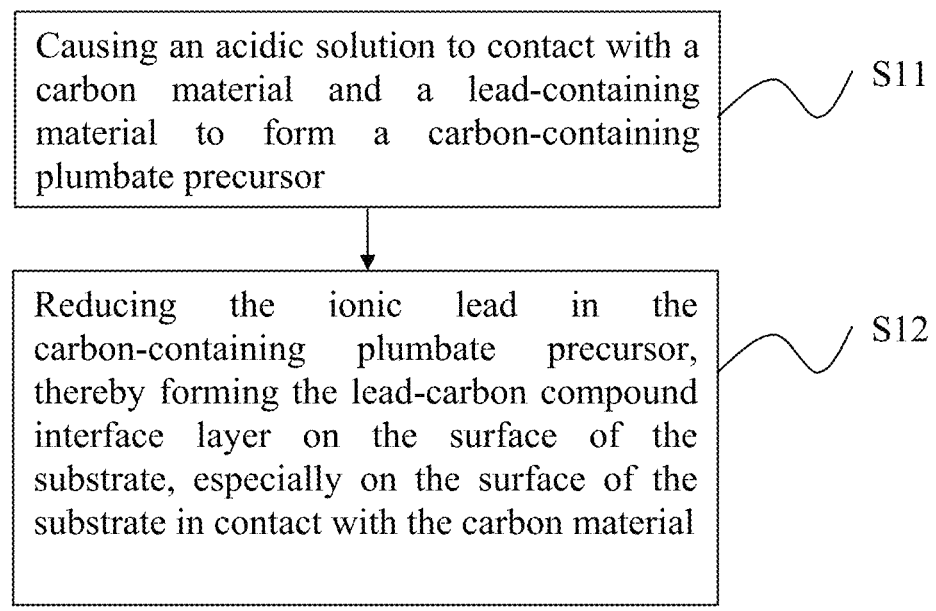
FIG. 1 is a schematic flowchart of a method of forming a metal-carbon compound interface layer on a surface of a metal-based substrate according to an embodiment of the present invention.
Figure 2A:
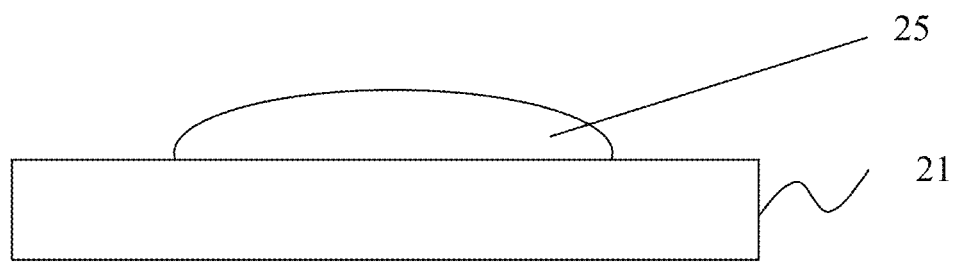
FIGS. 2A-2E are schematic cross-sectional views of substrates formed by a method of forming a metal-carbon compound interface layer on a surface of a metal-based substrate according to a first embodiment of the present invention.
Figure 2B:
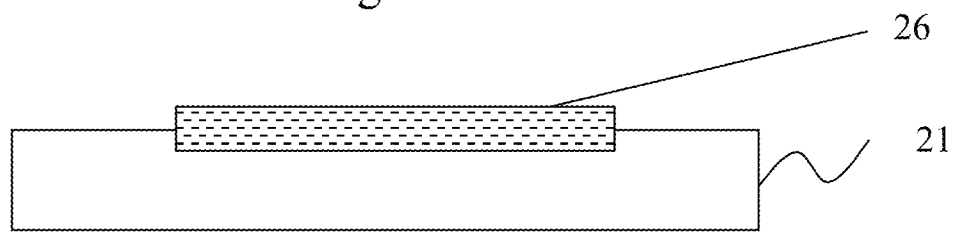
Figure 2C:
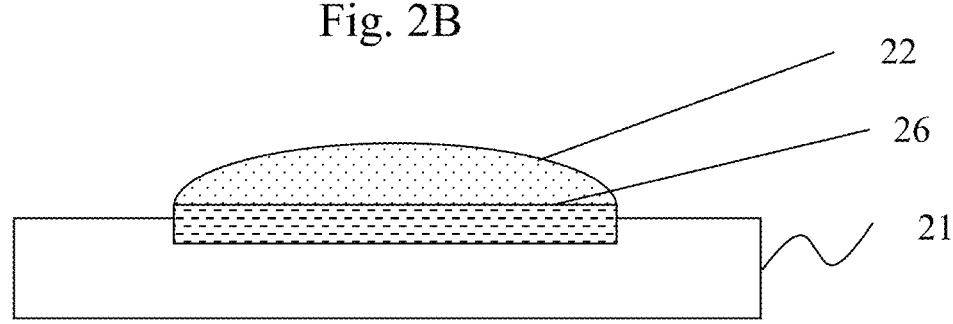
Figure 2D:
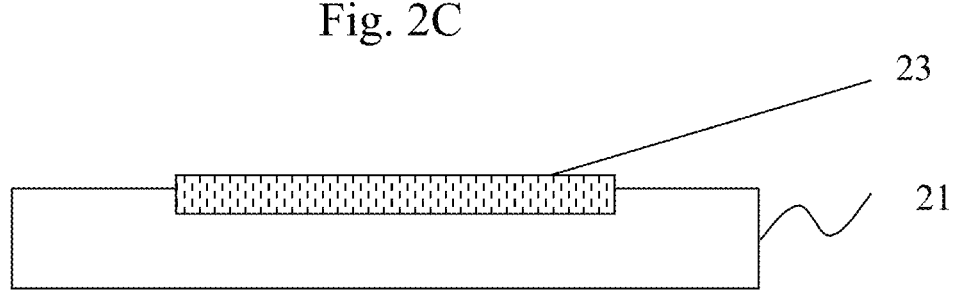
Figure 2E:
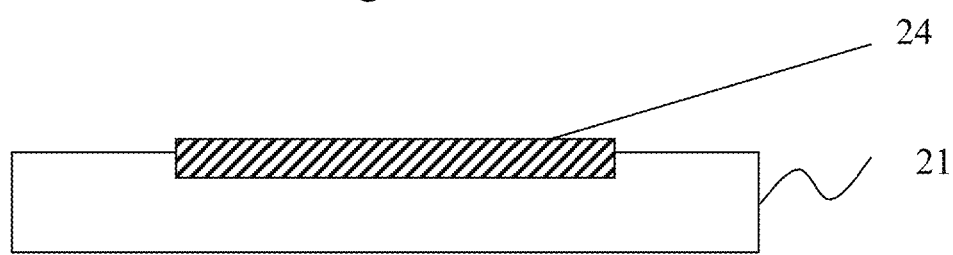

FIG. 1 is a schematic flowchart of a method of forming a metal-carbon compound interface layer on a surface of a metal-based substrate according to an embodiment of the present invention. As shown in FIG. 1, the present invention provides a method for forming a lead-carbon compound interface layer on the surface of a lead-based substrate. The method includes steps S11 and S12. Step S11 is a step of causing an acidic solution to contact with a carbon material and a lead-containing material to form a carbon-containing plumbate precursor, wherein the acidic solution includes an acid and a solvent. The acidic solution is one selected from nitric acid, acetic acid, or a combination thereof. The solvent is selected from water, methanol, ethanol, ethylene glycol, liquid ammonia, hydrazine, or a combination thereof. The carbon material is selected from carbon black, oxidized carbon black, activated carbon, oxidized activated carbon, graphene, graphene oxide or a combination thereof. The lead-containing material includes lead, a lead-tin alloy, or a lead-calcium-tin alloy. The carbon-containing plumbate precursor is lead nitrate or lead acetate. Step S12 is a step of reducing the ionic lead in the carbon-containing plumbate precursor, thereby forming the lead-carbon compound interface layer on the surface of the substrate, especially on the surface of the substrate in contact with the carbon material. The reduction is carried out by a thermal treatment or by adding a reducing agent. The temperature range of the thermal treatment is above the reduction temperature of the plumbate precursor. The suitable reducing agent is one selected from a group consisting of formaldehyde, oxalic acid, ethylene glycol, sodium borohydride, potassium borohydride, stannous chloride, hypophosphorous acid, sodium hypophosphite, sodium thiosulfate, and hydrazine. For example, on the condition that the plumbate precursor is lead nitrate and the carbon material is graphene oxide, the lead ions in the lead nitrate are reduced to lead, and thus a lead-carbon compound interface layer composed of a lead/graphene oxide composite material is formed on the surface of the substrate, especially on the surface of the substrate in contact with the carbon material (i.e. the graphene oxide). In a preferred embodiment, the carbon material can be uniformly dispersed in the solvent contained in the acidic solution, otherwise the carbon material is difficult to be tightly bonded to the lead during the reduction process. In addition, when water is used as the solvent, the carbon material needs to have a hydrophilic functional group, such as an oxygen functional group or a Na ion containing a surfactant, while when a polar solvent such as ethylene glycol is used as the solvent, this kind of functional group is not necessary in this case. The steps S11 and S12 described above can also be performed by at least one of the following three different embodiments, which are shown in FIGS. 2A-2E, 3, 4A-4C, 5, 6A-6C, and 7, and described below.

Figure 3:
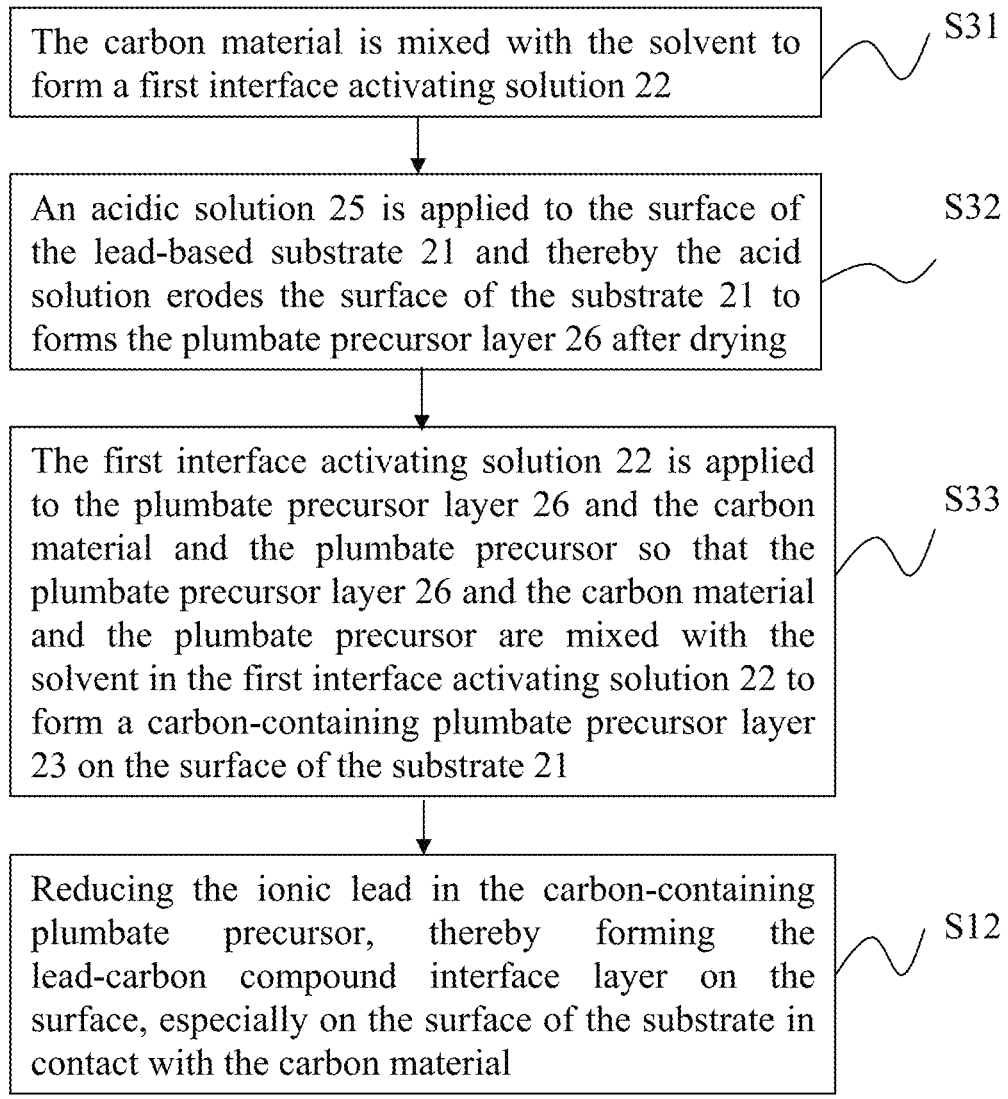
FIG. 3 is a flowchart of a method of forming a metal-carbon interface layer on a surface of a metal-based substrate according to the first embodiment of the present invention.

The first embodiment according to the present invention is shown in FIGS. 2A-2C and 3. FIGS. 2A-2E are schematic cross-sectional views of substrates formed by a method of forming a metal-carbon compound interface layer on a surface of a metal-based substrate according to a first embodiment of the present invention, and FIG. 3 is a flowchart of a method of forming a metal-carbon interface layer on a surface of a metal-based substrate according to the first embodiment of the present invention. Referring to FIGS. 2A-2C and 3, in Step S31, the carbon material is mixed with the solvent to form a first interface activating solution 22. Next, in Step S32, an acidic solution 25 is applied to the surface of the lead-based substrate 21 and thereby the acid solution erodes the surface of the substrate 21 to form the plumbate precursor layer 26 after being dried. Then, in Step S33, the first interface activating solution 22 is applied to the plumbate precursor layer 26 and the carbon material and the plumbate precursor so that the plumbate precursor layer 26 and the carbon material and the plumbate precursor are mixed with the solvent in the first interface activating solution 22 to form a carbon-containing plumbate precursor layer 23 on the surface of the substrate 21. Thereafter, the aforementioned Step S12 is performed. At this moment, on a condition that the plumbate precursor is lead nitrate, the lead ions in the lead nitrate are reduced to lead, and thereby the chemically bonded lead-carbon compound interface layer 24 is formed on the surface of the substrate 21 at least in the area that contacts the carbon material.

In the first embodiment according to the present invention, the carbon material can be used in a form of a solution or a gel. In addition, any of the processes of coating, spraying, dispensing, painting, dipping, and so on, can be used in at least one of the steps of (a) applying the acidic solution 22 to the surface of the substrate 21 and (b) applying the first interface activating solution 23 to the surface of the substrate 21.

The second embodiment according to the present invention is shown in FIGS. 4A-4C and 5. FIGS. 4A-4C are schematic cross-sectional views of substrates formed by the method of forming a metal-carbon compound interface layer on a surface of a metal-based substrate according to a second embodiment of the present invention, and FIG. 5 is a flowchart of a method of forming a metal-carbon interface layer on a surface of a metal-based substrate according to the second embodiment of the present invention. Please refer to FIGS. 4A-4C and 5. In Step S51, the acidic solution and the carbon material are mixed to form a second interface activator solution 42. Then, in Step S52, the second interface activator solution is applied on the surface of the lead-based substrate 41 and thereby the acidic solution in the second interface activating solution 42 erodes the surface of the substrate 41 and form a carbon-containing plumbate precursor layer 43 on the surface of the substrate 41. Thereafter, the aforementioned Step S12 is performed. At this moment, on a condition that the plumbate precursor is lead nitrate, lead ions in the lead nitrate are reduced to lead, and thereby the chemically bonded lead-carbon compound interface layer 44 is formed on the surface of the substrate 41 in the area that contacts the carbon material.

In the second embodiment according to the present invention, the carbon material can be used in the form of a solution or a gel. In addition, any of the processes of coating, spraying, dispensing, painting, dipping, and so on, can be used in the step of applying the second interface activating solution 42 to the surface of the substrate 41.

Figure 6A:
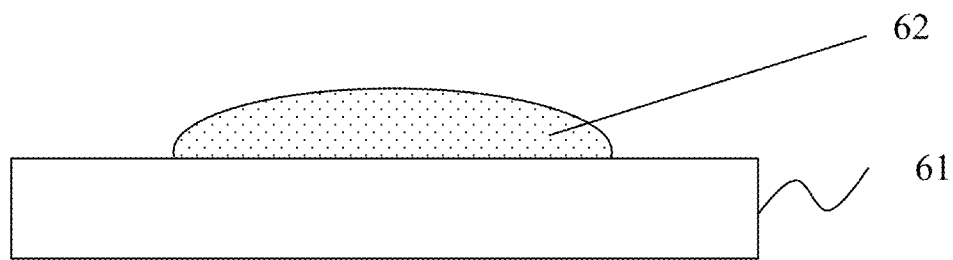
FIGS. 6A-6C are schematic cross-sectional views of substrates formed by the method of forming a metal-carbon compound interface layer on a surface of a metal-based substrate according to a second embodiment of the present invention.
Figure 6B:
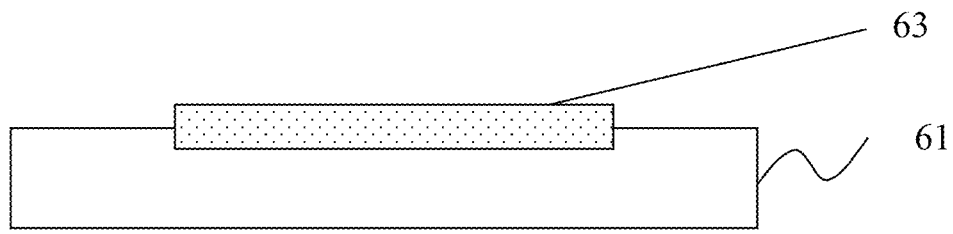
Figure 6C:
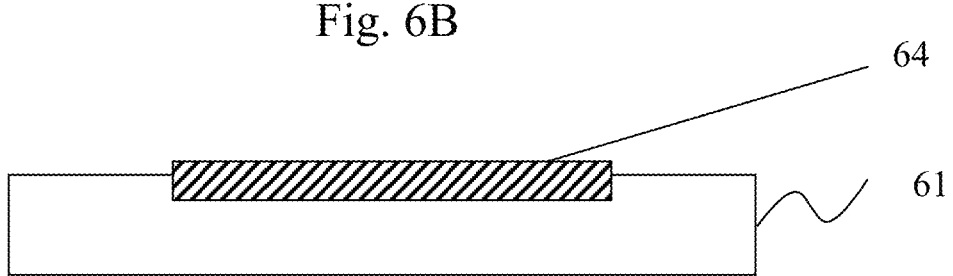
Figure 7:
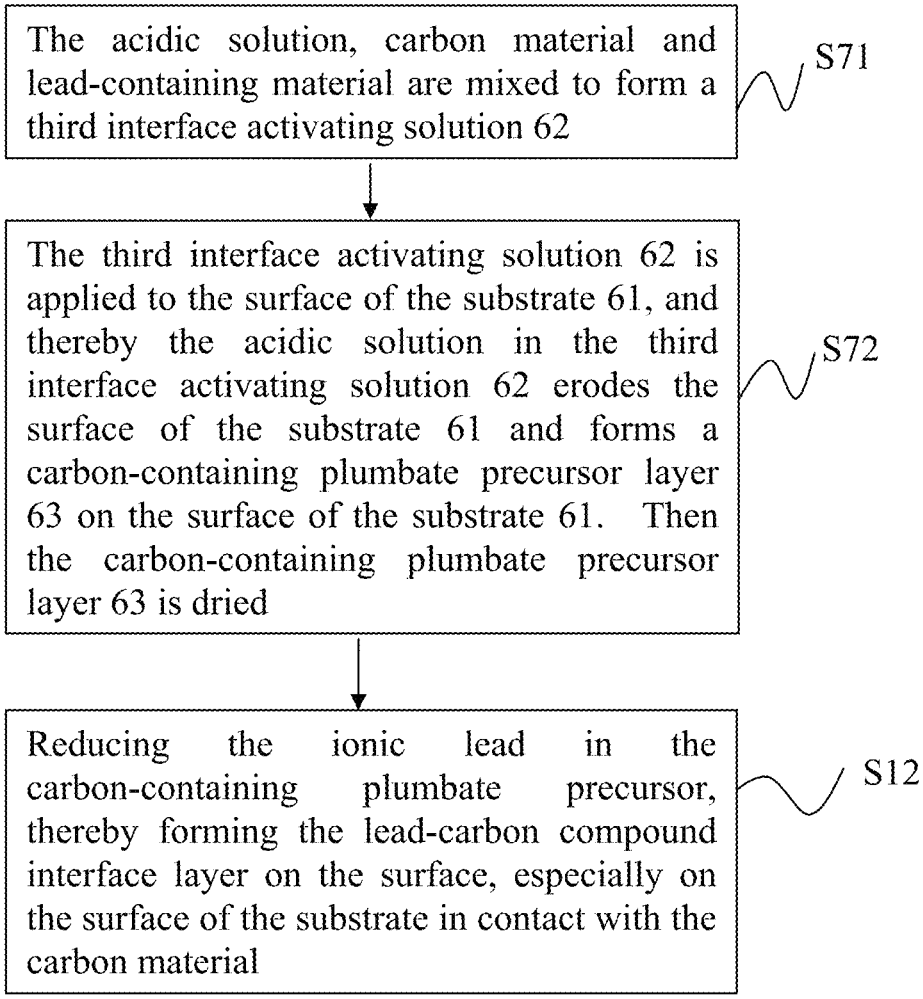
FIG. 7 is a flowchart of a method of forming a metal-carbon interface layer on a surface of a metal-based substrate according to the second embodiment of the present invention.

A third embodiment according to the present invention is shown in FIGS. 6A-6C and 7. FIGS. 6A-6C are schematic cross-sectional views of substrates formed by the method of forming a metal-carbon compound interface layer on a surface of a metal-based substrate according to a third embodiment of the present invention, and FIG. 7 is a flowchart of a method of forming a metal-carbon interface layer on a surface of a metal-based substrate according to the third embodiment of the present invention. Please refer to FIGS. 6A-6C and 7. In Step S71, the acidic solution, carbon material and lead-containing material are mixed to form a third interface activating solution 62. Then, in Step S72, the third interface activating solution 62 is applied to the surface of the substrate 61, and thereby the acidic solution in the third interface activating solution 62 erodes the surface of the substrate 61 and form a carbon-containing plumbate precursor layer 63 on the surface of the substrate 61. Then the carbon-containing plumbate precursor layer 63 is dried. Thereafter, the aforementioned Step S12 is performed. At this moment, on a condition that the plumbate precursor of the carbon-containing material is lead nitrate of a carbon-containing material, lead ions in the lead nitrate are reduced to lead, and thereby the chemically bonded lead-carbon compound interface layer 64 is formed on the surface of the substrate 61 in the area that contacts the carbon material.

In the third embodiment according to the present invention, the carbon material can be used in the form of a solution or a gel. In addition, any of the processes of coating, spraying, dispensing, painting, dipping, and so on, can be used in the step of applying the third interface activating solution 62 to the surface of the substrate 61.

In another embodiment according to the present invention, the substrate may be in a shape of a plate or a grating (also referred to as a grid). If the substrate is applied for an acid battery, the substrate can have the shape suitable for the design of the electrode used in the acid battery.

Example of Pure Lead Substrate

The preparation and effect evaluation of the lead-carbon compound interface layer according to a preferred embodiment of the present invention are described below, which adopts the method of the first embodiment described above. Graphene oxide (GO) is mixed with water to form a GO aqueous solution. GO gel can be used for the preparation of GO aqueous solution. Pure water is added to dilute its concentration to make multi-layer GO dilute to a few-layer GO to avoid agglomeration of GO and non-uniform concentration of GO during the subsequent solution preparation. The saturation concentration of GO aqueous solution is about 0.008 wt %. With this saturation concentration, the solution is transparent and clear with good light transmission. When the concentration of GO is more than 0.008 wt %, suspended particles are likely to be formed due to agglomeration, which causes the problem of non-uniform coverage to the carbon materials in the subsequent process. Below the saturation concentration, the higher the GO concentration, the more GO is formed in the deposition layer of the plumbate precursor in the subsequent process, and the denser the lead-carbon compound formed on the surface of the lead substrate.

Next, the pretreated lead substrate (for example, after being cleaned with acetone and/or detergent) is immersed in 5% nitric acid for 3 seconds and then dried, so that the plumbate (i.e. lead nitrate in this case) deposition layer is formed on the surface of the lead substrate. Then, the GO aqueous solution is dropped on the lead nitrate deposition layer so that the GO aqueous solution and the nitrate deposition layer are mixed through the dissolution of lead nitrate to water to form a GO-containing plumbate deposition layer.

Next, a thermal treatment at a temperature about 250° C. or above is performed to reduce the lead ions in the lead nitrate deposition layer to lead so as to form lead nanoparticles on the surfaces of GO and the lead substrate simultaneously, and thereby to form the chemically bonded lead/GO compound at the interface between the lead substrate and the GOs. To confirm the electrochemical properties of the lead/GO compound interface layer, we performed an electrochemical cyclic voltammetry (CV) test. The scanning range of CV was from −1 to 0 V, the scan rate was 0.02 V/s, and the reference electrode was a calomel electrode. If no other CV test conditions are explained in the following descriptions, it means that same test conditions are used.

FIG. 8 is a cyclic voltammetry (CV) diagram of an electrode with a lead/GO compound interface layer made by the method according to the present invention. As shown in FIG. 8, the CV curve of the first circle showed the electrochemical characteristics at the initial state, representing only the pure lead at the initial stage. The oxidization potential of the working electrode was about 100 mA. It can be observed from the CV curve of the first circle that there is almost no distance present between the oxidation curve and the reduction curve (hereinafter both referred to as the two curves) at the junction (at the working electrode voltage of about −0.65 eV) between the two curves, indicating no obvious observation with the capacitive effect at the first cycle. As the oxidation-reduction cycles went on, new lead sulfate crystals generated and grew on the surface of the electrode, so the oxidation and reduction current would gradually increase. At the $300^{th}$ cycle, the oxidation current increased to about 200 mA, and the distance between the two curves at the redox junction (at about −0.67 eV) also gradually increased, representing that the capacitive effect of GO also gradually increased. At the $350^{th}$ cycle, the capacitance effect of GO is more obvious. At the $400^{th}$ cycle, although the oxidation peak of lead still existed, however, because the capacitance of GO has a negative current in the negative voltage region, the oxidation current curve of lead is subject to the capacitance effect of GO and so the curve appeared declining from the top right toward the lower left. Compared with the CV curve of the first cycle, it was found in the test results of the CV curves from the $300^{th}$ to the $400^{th}$ cycles that the electrode with the lead/GO compound interface layer had the capacitance effect of GO, which increased and became more obvious with increase of the number of cycles. It was because, as the number of cycles increased, the lead ions gradually diffused to the GO surface and into the gaps between GOs, so that when the fine lead sulfate crystals gradually grew in the space between GOs in a tightly stacked GO structure that resulted from the leaving of the $H_2O$ molecules from each of the GO layers during the thermal treatment process, the gap (i.e. the distance) between the two CV curves increased. Accordingly the surface area of GO participating in the electrochemical reaction gradually increased, and the phenomenon of increase of the capacitance effect appeared.

FIGS. 9A-9D are SEM photographs of the interfaces of the electrodes, after the test of 400 cycles of cyclic voltammetry, with and without the lead/GO compound interface layer made on the electrode surface by the method according to the present invention. As shown in FIGS. 9A-9D, it can be observed that the sizes of the lead sulfate crystals in the regions 91, 93, 95, and 97 having the lead/GO compound interface layer were about 0.5-1 μm, and the sizes of the lead sulfate crystals in the regions 92, 94, 96 and 98 having no lead/GO compound interface layer were about 2-3 μm. It showed that the addition of GO material could actually inhibit the growth of the lead sulfate crystals, resulting in the formation of the fine structure of the nanolized lead sulfate. During the charge and discharge process, the nanolized lead sulfate particles were more easily reduced to a nano lead structure than the larger crystalline lead sulfate particles, inhibited the sulfurization effect in the lead-acid battery, increased the cyclic charge and discharge efficiency, and prolonged the life time of the battery.

Figure 10:
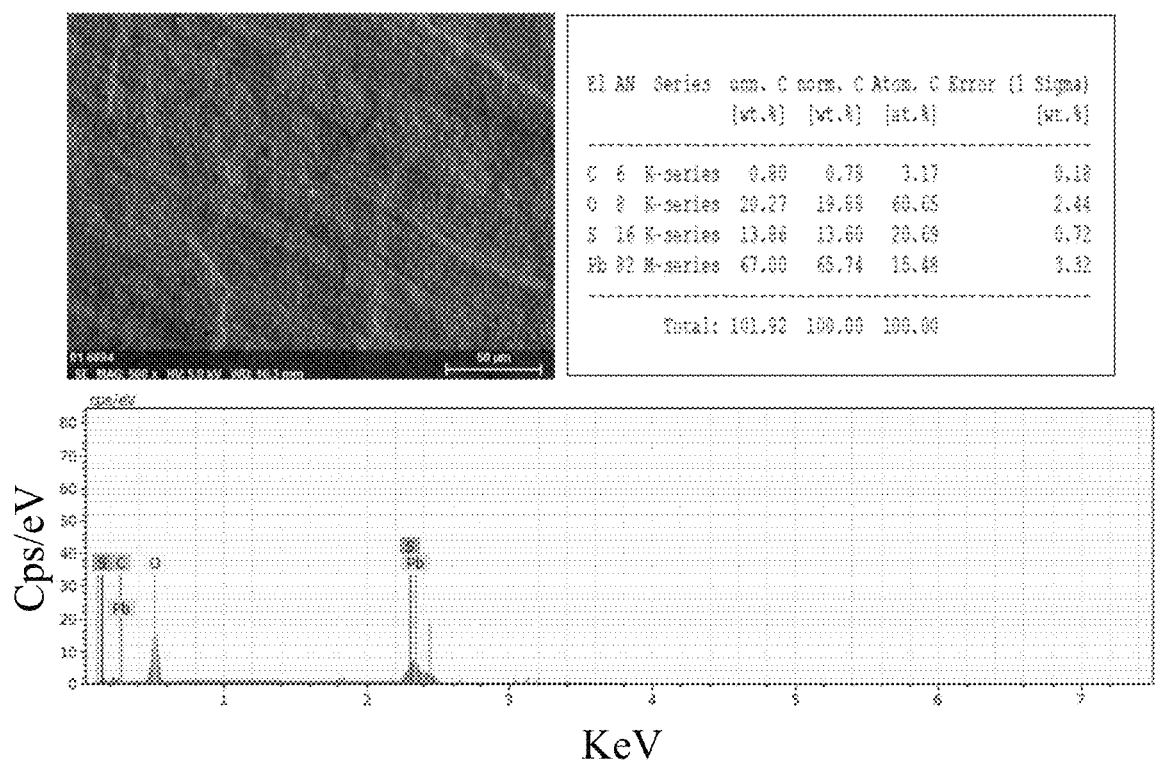
FIG. 10 is an EDS analysis diagram in a lead/GO compound interface layer region made by the method according to the present invention.

FIG. 10 is an EDS analysis diagram in a lead/GO compound interface layer region made by the method according to the present invention. As shown in FIG. 10, it can be seen that the atomic percentage of carbon is 3.17%, and those of oxygen, sulfur, and lead are 60.65%, 20.69%, and 15.48%, respectively. Although the atomic percentage of carbon is only 3.17%, because the CV curve still shows obvious GO capacitance effect, it can be expected that GO still exists at the metal lead/GO interface. This interface is covered with a layer of the nanolized lead sulfate structure generated from multiple cycles of charge and discharge.

Figure 11:
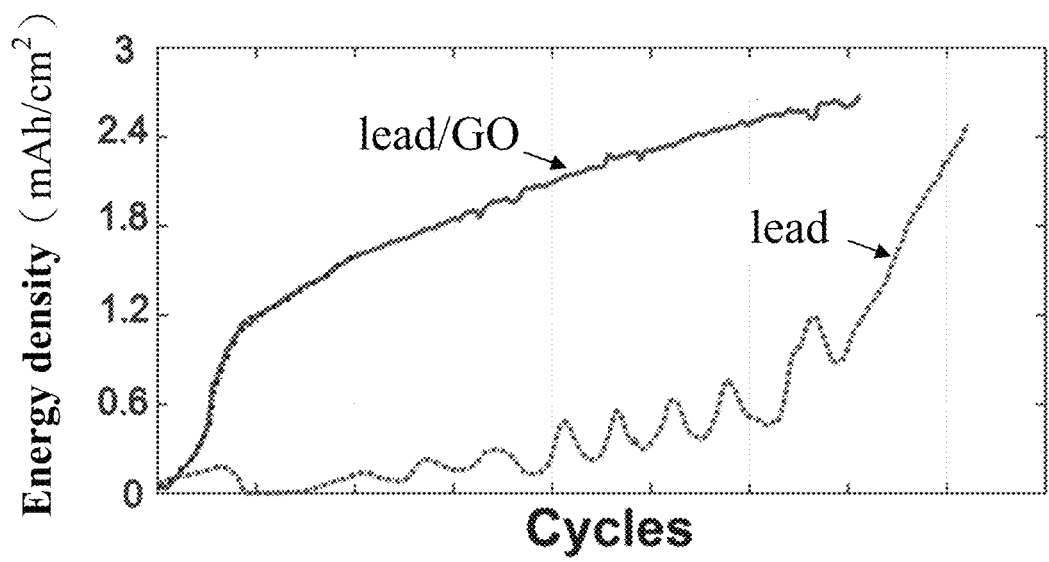
FIG. 11 is a graph showing changes of the energy density of lead/GO batteries according to the present invention and lead batteries when the number of the cycles of charge and discharge increases.

Finally, a lead/GO battery including a lead/GO compound interface layer was sent to a charge and discharge test to evaluate its capacitance, and compared with a lead battery including a pure lead substrate. FIG. 11 is a graph showing changes of the energy density of lead/GO batteries according to the present invention and lead batteries when the number of the cycles of charge and discharge increases. The positive electrode of the lead/GO battery was a pure lead plate, and the negative electrode was a lead-carbon electrode including a lead/GO compound interface layer prepared by the method of the first embodiment according to the present invention. The positive and negative electrodes of the lead battery were pure lead plates. Both types of batteries were charged at a constant voltage of 2.4V. An unsaturated charging method was applied to both batteries and the charging time was about 0.5 to 1 hour, and the discharge mode was performed at a discharge rate of about ⅓ to 1 C.

As shown in FIG. 11, when comparing the curve of the charge/discharge energy density of the lead/GO batteries to that of the lead batteries, it was shown that the increase rate of the energy density of the lead/GO battery with the lead/GO compound interface layer is much higher than that of the lead batteries. The energy density of the battery tested by the unsaturated charge and discharge method can reach 2.5 mAh/cm2 or more. After charging for a long time, the energy density of the lead/GO battery (about 0.2 $mAh/cm^2$) is 10 times more than that of the lead battery (i.e. the lead-acid battery including traditional pure lead substrates).

Examples of Various Reduction Temperatures Using the Pure Lead Plate

Figure 12:
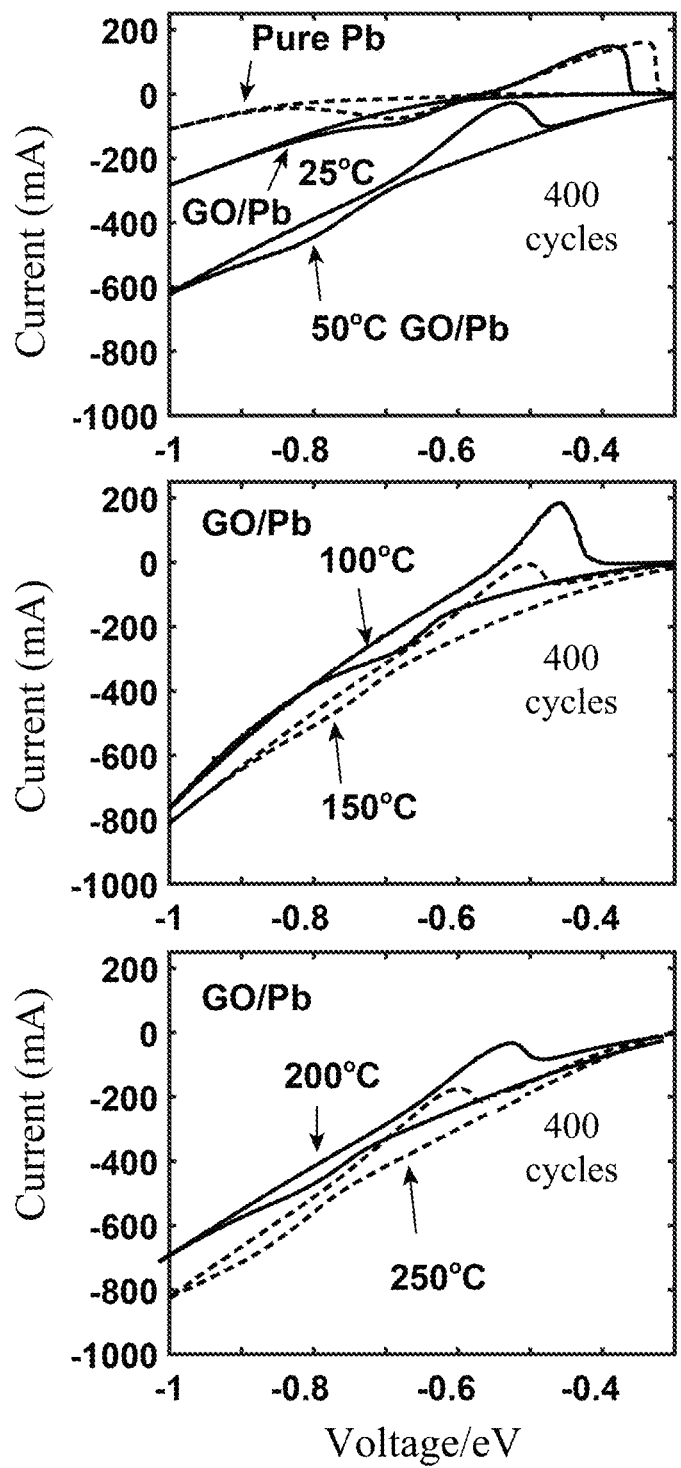
FIG. 12 is a CV curve diagram of the first circle of the electrodes made of lead plates with different thermal treatment temperatures according to the present invention.

In a preferred embodiment according to the present invention, the lead-carbon compound interface layer prepared after treatment at various temperatures (25° C., 50° C., 100° C., 150° C., 200° C. and 250° C.) and its effect evaluation are described below. FIG. 12 is a CV curve diagram of the first circle of the electrodes made of lead plates with different thermal treatment temperatures according to the present invention. It could be found that at these temperatures, each of the electrodes would have a capacitive effect, and the resulting capacitance value would increase with the increase in temperature. That is to say, after the CV test for 400 circles, it was proved that the metal lead and the carbon material would bond to each other at room temperature, and the bonding effect will increase as the thermal treatment temperature increases. It should be understood that the integer cycle obtained in the embodiments according to the present invention does not mean that the occurrence is right at the cycle that the capacitive effect appears.

Example of the Preparation of the Grid

The preparation of the lead-carbon compound interface layer of another preferred embodiment according to the present invention and the effect evaluation thereof are described below. GO was mixed with 5% nitric acid to form an aqueous GO nitric acid solution. GO gel could be used to prepare the aqueous GO-containing nitric acid solution. Pure water was added to the GO gel, so that GO was diluted from a multi-layer form to a few-layer form to avoid agglomeration, and then an aqueous nitric acid solution of 5% was added and mixed with the GO uniformly to form the aqueous GO-containing nitric acid solution.

Next, the aqueous GO-containing nitric acid solution was applied by painting it onto the entire surface of a grid composed of a lead-calcium-tin alloy, and the grid was eroded by the nitric acid contained in the painted aqueous GO-containing nitric acid solution, so that a lead nitrate salt precursor was formed on the surface of the grid. By way of the effect of the water mixed therein, a GO-containing nitrate deposition layer was formed on the surface of the grid consequently. After drying, a thermal treatment process of 250° C. was performed to reduce the lead ions in the lead nitrate deposition layer to the lead nanoparticles on both of the surfaces of GO and the grid, thereby a chemically bonded lead/GO compound interface was formed on the grid, especially on the grid surface in contact with the GO. To confirm the electrochemical properties of the grid/GO compound interface layer, we performed the electrochemical cyclic voltammetry (CV) test.

Figure 13:
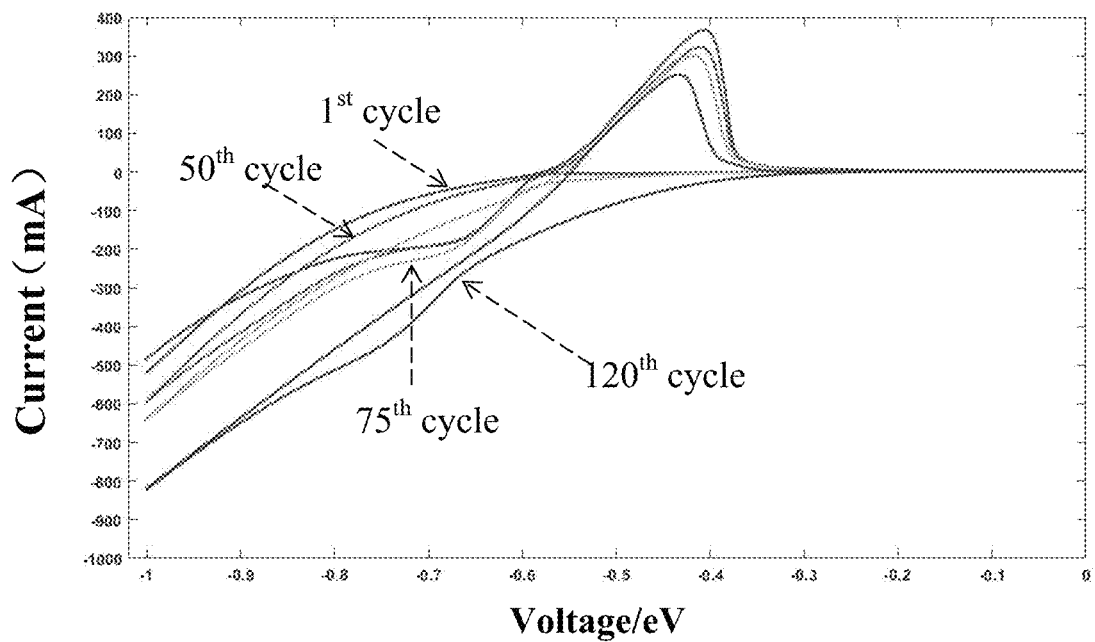
FIG. 13 is a CV curve diagram showing different numbers of cycles of the electrodes each formed on a grid by a method according to the present invention.

FIG. 13 is a CV curve diagram showing different numbers of cycles of the electrodes each formed on a grid by a method according to the present invention. As shown in FIG. 13, when the heat-treated grid was tested for 50, 75 and 120 cycles, it can be found that the capacitance effect gradually appeared. That is to say, after several CV cycles in the test, the lead ions gradually diffused to the GO surface and into the gaps between GOs, so that when the fine lead sulfate crystals gradually grew in the space between GOs in a tightly stacked GO structure that resulted from the leaving of the $H_2O$ molecules from each of the GO layers during the thermal treatment process, the gap (i.e. the distance) between the two CV curves increased. Accordingly the surface area of GO participating in the electrochemical reaction gradually increased. Therefore, the surface area of GOs that participated in the electrochemical reaction gradually increased, and the phenomenon of increase of the capacitance effect appeared. It proved that the metal lead and the carbon material had been tightly bonded.

The preparation of the lead-carbon compound interface layer of another preferred embodiment according to the present invention and the effect evaluation thereof are described below. A lead plate was dissolved in a 10% nitric acid solution, and then an aqueous GO-containing solution was added and mixed uniformly to form an aqueous GO-containing lead nitrate solution. The GO gel could be used for the preparation of the aqueous GO-containing solution. Pure water was added to the GO gel, so that GO was diluted from a multi-layer form to a few-layer form to avoid agglomeration. For dilution purpose, the pure water, serving as a dilution solvent, can be replaced with an aqueous nitric acid solution of 5% to achieve a similar dispersion effect.

Next, the aqueous GO-containing lead nitrate solution was applied by painting it onto the entire surface of a grid composed of a lead-calcium-tin alloy, and the grid was eroded by the nitric acid contained in the painted aqueous GO-containing lead nitrate solution, so that a lead nitrate salt precursor was formed on the surface of the grid. By way of the effect of the water mixed therein, a GO-containing nitrate deposition layer was formed on the surface of the grid consequently. After drying, a thermal treatment process of 250° C. was performed to reduce the lead ions in the lead nitrate deposition layer to the lead nanoparticles on both of the surfaces of GO and the grid, thereby a chemically bonded lead/GO compound interface was formed on the grid, especially on the grid surface in contact with the GO. To confirm the electrochemical properties of the grid/GO compound interface layer, we performed the electrochemical cyclic voltammetry (CV) test.

Figure 14:
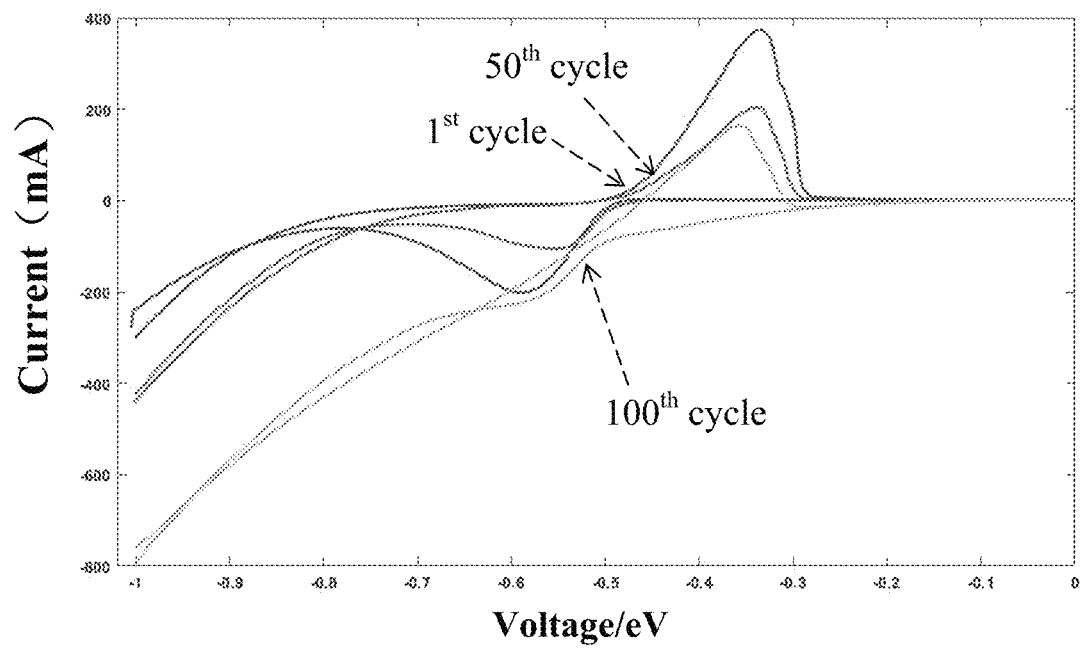
FIG. 14 is a CV curve diagram of an electrode with a grid/GO compound interface layer made by a method according to the present invention.

FIG. 14 is a CV curve of an electrode made with a grid/GO compound interface layer according to the present invention. As shown in FIG. 14, the CV curve of the first cycle showed only the electrochemical property of the grid itself at the beginning. At this moment, the oxidation current is about 400 mA. It was observed from the CV curve of the first cycle that the junction (with about −0.6 eV distance) had almost no gap between the oxidation and reduction curves, indicating that there is no significant capacitive effect at this moment. With the increase of the number of cycles, for example, after 50 or even 100 CV cycles in the test, the lead ions gradually diffused to the GO surface and into the gaps between GOs, so that when the fine lead sulfate crystals gradually grew in the space between GOs in a tightly stacked GO structure that resulted from leaving of the moisture during the thermal treatment process, the gap (i.e. the distance) between the two CV curves increased. Accordingly the surface area of GO participating in the electrochemical reaction gradually increased. Therefore, the surface area of GOs that participated in the electrochemical reaction gradually increased, and the phenomenon of increase of the capacitance effect appeared.

The various embodiments according to the present invention described above and various changes or modifications thereof belong to the scope of the method for forming a lead-carbon compound interface layer on a lead-based substrate and the acid battery having the lead-carbon compound interface layer provided by the present invention. The advantages achieved by the method for forming a lead-carbon compound interface layer on a lead-based substrate and the acid battery having the lead-carbon compound interface layer provided by the present invention include that the life time and the capacitance of the acid battery can be significantly improved. In addition, because it is not necessary to use noble metal such as titanium, palladium and platinum, the cost of producing the lead-carbon compound interface layer is significantly lower than that of electrodes manufactured using prior techniques. Therefore, the present invention can surely be widely used in the practical applications of batteries.

EMBODIMENTS

1. A method for forming a lead-carbon compound interface layer on a lead-based substrate, wherein the lead-based substrate has a surface, the method comprising steps of: causing an acidic solution to contact with a carbon material and a lead-containing material to form a carbon-containing plumbate precursor having an ionic lead; and reducing the ionic lead in the carbon-containing plumbate precursor to form the lead-carbon compound interface layer on the surface.

2. The method of Embodiment 1, wherein the causing step is one of a method 1, a method 2 and a method 3, wherein: the method 1 includes steps of: mixing the carbon material with a solvent to form a first interface activating solution;

applying the acidic solution to the surface; and applying the first interface activating solution to the surface applied thereon with the acidic solution; the method 2 includes steps of: mixing the acidic solution with the carbon material to form a second interface activating solution; and applying the second interface activating solution to the surface; and the method 3 includes steps of: mixing the acidic solution with the carbon material and the lead-containing material to form a third interface activating solution; and applying the third interface activating solution to the surface.

3. The method of Embodiments 1-2, wherein at least one of the steps of applying the first interface activating solution in the method 1, applying the acidic solution in the method 2, and applying the third interface activating solution in the method 3 is performed by using one selected from a group consisting of coating, spraying, dispensing, painting and dipping.

4. The method of Embodiments 1-3, wherein the solvent is one selected from a group consisting of a water, a methyl alcohol, an ethyl alcohol, an ethylene glycol, a liquid ammonia, a hydrazine and a combination thereof.

5. The method of Embodiments 1-4, wherein the carbon-containing plumbate precursor is dissolvable in the solvent.

6. The method of Embodiments 1-5, wherein the reducing step is carried out by one of adding a reducing agent and heating.

7. The method of Embodiments 1-6, wherein the reducing agent is one selected from a group consisting of a formaldehyde, an oxalic acid, an ethylene glycol, a sodium borohydride, a potassium borohydride, a stannous chloride, a hypophosphorous acid, a sodium hypophosphite, a sodium thiosulfate, and a hydrazine.

8. The method of Embodiments 1-7, wherein the heating is performed at a temperature of 250° C. and above.

9. The method of Embodiments 1-8, wherein the lead-carbon compound interface layer having a lead and a carbon chemically bonded with each other.

10. The method of Embodiments 1-9, wherein the lead-containing material is dissolvable in the acidic solution.

11. The method of Embodiments 1-10, wherein the carbon material is one selected from a group consisting of a carbon black, an oxidized carbon black, an activated carbon, an oxidized activated carbon, a graphene, an oxidized graphene and a combination thereof.

12. The method of Embodiments 1-11, wherein the acidic solution is one selected from a group consisting of a nitric acid, an acetic acid and a combination thereof.

13. The method of Embodiments 1-12, wherein the lead-containing material is one of a lead and a lead alloy.

14. The method of Embodiments 1-13, wherein the lead alloy is one of a lead tin alloy and a lead calcium tin alloy.

15. The method of Embodiments 1-14, wherein the plumbate precursor is one selected from a group consisting of a lead nitrate, a lead acetate and a combination thereof.

16. The method of Embodiments 1-15, wherein the plumbate precursor is the lead nitrate.

17. The method of Embodiments 1-16, wherein the lead-based substrate is one of a lead and a lead dioxide.

18. A method for preparing an electrode material having a lead-based substrate forming thereon a lead-carbon compound interface layer, wherein the lead-based substrate has a surface, and the method comprising steps of: causing an acidic solution to contact with a carbon material and a lead-containing material to form a carbon-containing plumbate precursor having an ionic lead; and reducing the ionic lead in the carbon-containing plumbate precursor to form the lead-carbon compound interface layer on the surface.

19. The method of Embodiments 18, wherein the causing step is performed by one of a method 1, a method 2 and a method 3, wherein: the method 1 includes steps of: mixing the carbon material with a solvent to form a first interface activating solution; applying the acidic solution to the surface; and applying the first interface activating solution to the surface applied thereon with the acidic solution; the method 2 includes steps of: mixing the acidic solution with the carbon material to form a second interface activating solution; and applying the second interface activating solution to the surface; and the method 3 includes steps of: mixing the acidic solution with the carbon material and the lead-containing material to form a third interface activating solution; and applying the third interface activating solution to the surface.

20. The method of Embodiments 18-19, wherein the reducing step is carried out by one of adding a reducing agent and heating.

While the present disclosure has been described in terms of what is presently considered to be the most practical and preferred embodiments, it is to be understood that the present disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for forming a lead-carbon compound interface layer on a lead-based substrate, wherein the lead-based substrate has a surface, the method comprising steps of:
   causing an acidic solution to contact with a carbon material and a lead-containing material to form a carbon-containing plumbate precursor having an ionic lead; and
   reducing the ionic lead in the carbon-containing plumbate precursor to form the lead-carbon compound interface layer on the surface.

2. The method according to claim 1, wherein the causing step is one of a method 1, a method 2 and a method 3, wherein:
   the method 1 includes steps of:
      mixing the carbon material with a solvent to form a first interface activating solution;
      applying the acidic solution to the surface; and
      applying the first interface activating solution to the surface applied thereon with the acidic solution;
   the method 2 includes steps of:
      mixing the acidic solution with the carbon material to form a second interface activating solution; and
      applying the second interface activating solution to the surface; and
   the method 3 includes steps of:
      mixing the acidic solution with the carbon material and the lead-containing material to form a third interface activating solution; and
      applying the third interface activating solution to the surface.

3. The method according to claim 2, wherein the respective step of applying the first interface activating solution is performed by using one selected from a group consisting of coating, spraying, dispensing, painting and dipping.

4. The method according to claim 2, wherein the solvent is one selected from a group consisting of a water, a methyl alcohol, an ethyl alcohol, an ethylene glycol, a liquid ammonia, a hydrazine and a combination thereof.

5. The method according to claim 2, wherein the carbon-containing plumbate precursor is dissolvable in the solvent.

6. The method according to claim 1, wherein the reducing step is carried out by one of adding a reducing agent and heating.

7. The method according to claim 6, wherein the reducing agent is one selected from a group consisting of a formaldehyde, an oxalic acid, an ethylene glycol, a sodium borohydride, a potassium borohydride, a stannous chloride, a hypophosphorous acid, a sodium hypophosphite, a sodium thiosulfate, and a hydrazine.

8. The method according to claim 6, wherein the heating is performed at a temperature of 250° C. and above.

9. The method according to claim 1, wherein the lead-carbon compound interface layer having a lead and a carbon chemically bonded with each other.

10. The method according to claim 1, wherein the lead-containing material is dissolvable in the acidic solution.

11. The method according to claim 1, wherein the carbon material is one selected from a group consisting of a carbon black, an oxidized carbon black, an activated carbon, an oxidized activated carbon, a graphene, an oxidized graphene and a combination thereof.

12. The method according to claim 1, wherein the acidic solution is one selected from a group consisting of a nitric acid, an acetic acid and a combination thereof.

13. The method according to claim 1, wherein the lead-containing material is one of a lead and a lead alloy.

14. The method according to claim 13, wherein the lead alloy is one of a lead tin alloy and a lead calcium tin alloy.

15. The method according to claim 1, wherein the plumbate precursor is one selected from a group consisting of a lead nitrate, a lead acetate and a combination thereof.

16. The method according to claim 15, wherein the plumbate precursor is the lead nitrate.

17. The method according to claim 1, wherein the lead-based substrate is one of a lead and a lead dioxide.

18. A method for preparing an electrode material having a lead-based substrate forming thereon a lead-carbon compound interface layer, wherein the lead-based substrate has a surface, and the method comprising steps of:
  causing an acidic solution to contact with a carbon material and a lead-containing material to form a carbon-containing plumbate precursor having an ionic lead; and
  reducing the ionic lead in the carbon-containing plumbate precursor to form the lead-carbon compound interface layer on the surface.

19. The method according to claim 18, wherein the causing step is performed by one of a method 1, a method 2 and a method 3, wherein:
  the method 1 includes steps of:
    mixing the carbon material with a solvent to form a first interface activating solution;
    applying the acidic solution to the surface; and
    applying the first interface activating solution to the surface applied thereon with the acidic solution;
  the method 2 includes steps of:
    mixing the acidic solution with the carbon material to form a second interface activating solution; and
    applying the second interface activating solution to the surface; and
  the method 3 includes steps of:
    mixing the acidic solution with the carbon material and the lead-containing material to form a third interface activating solution; and
    applying the third interface activating solution to the surface.

20. The method according to claim 18, wherein the reducing step is carried out by one of adding a reducing agent and heating.

* * * * *